(12) United States Patent
Bass et al.

(10) Patent No.: US 7,123,622 B2
(45) Date of Patent: Oct. 17, 2006

(54) METHOD AND SYSTEM FOR NETWORK PROCESSOR SCHEDULING BASED ON SERVICE LEVELS

(75) Inventors: Brian Mitchell Bass, Apex, NC (US); Jean Louis Calvignac, Cary, NC (US); Marco C. Heddes, Cary, NC (US); Michael Steven Siegel, Raleigh, NC (US); Fabrice Jean Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 09/834,141

(22) Filed: Apr. 12, 2001

(65) Prior Publication Data

US 2002/0023168 A1 Feb. 21, 2002

Related U.S. Application Data

(60) Provisional application No. 60/196,831, filed on Apr. 13, 2000.

(51) Int. Cl.
*H04L 12/56* (2006.01)
(52) U.S. Cl. ..................... 370/413; 370/418; 370/230.1
(58) Field of Classification Search .............. 370/230, 370/230.1, 231, 235, 412, 413, 415, 416, 370/417, 418, 428, 429, 465, 468; 710/52
See application file for complete search history.

(56) References Cited

U.S. PATENT DOCUMENTS

| 5,166,930 | A | * | 11/1992 | Braff et al. | 370/235 |
|---|---|---|---|---|---|
| 5,629,937 | A | * | 5/1997 | Hayter et al. | 370/233 |
| 5,734,650 | A | * | 3/1998 | Hayter et al. | 370/391 |
| 5,818,839 | A | * | 10/1998 | Sterne et al. | 370/391 |
| 5,835,494 | A | * | 11/1998 | Hughes et al. | 370/397 |
| 5,946,297 | A | * | 8/1999 | Calvignac et al. | 370/230 |
| 6,018,527 | A | * | 1/2000 | Yin et al. | 370/395.41 |
| 6,091,740 | A | * | 7/2000 | Karasawa | 370/458 |
| 6,320,845 | B1 | * | 11/2001 | Davie | 370/230 |
| 6,438,106 | B1 | * | 8/2002 | Pillar et al. | 370/232 |
| 6,438,134 | B1 | * | 8/2002 | Chow et al. | 370/412 |
| 6,452,933 | B1 | * | 9/2002 | Duffield et al. | 370/415 |

* cited by examiner

*Primary Examiner*—Bob A. Phunkulh
(74) *Attorney, Agent, or Firm*—Joscelyn G. Cockburn

(57) ABSTRACT

A system and method of moving information units from an output flow control toward a data transmission network in a prioritized sequence which accommodates several different levels of service. The present invention includes a method and system for scheduling the egress of processed information units (or frames) from a network processing unit according to service based on a weighted fair queue where position in the queue is adjusted after each service based on a weight factor and the length of frame, a process which provides a method for and system of interaction between different calendar types is used to provide minimum bandwidth, best effort bandwidth, weighted fair queuing service, best effort peak bandwidth, and maximum burst size specifications. The present invention permits different combinations of service that can be used to create different QoS specifications. The "base" services which are offered to a customer in the example described in this patent application are minimum bandwidth, best effort, peak and maximum burst size (or MBS), which may be combined as desired. For example, a user could specify minimum bandwidth plus best effort additional bandwidth and the system would provide this capability by putting the flow queue in both the NLS and WFQ calendar. The system includes tests when a flow queue is in multiple calendars to determine when it must come out.

27 Claims, 13 Drawing Sheets

METHOD AND SYSTEM FOR NETWORK PROCESSOR SCHEDULING BASED ON SERVICE LEVELS

CROSS REFERENCE TO RELATED PATENTS

This patent relates to and claims the benefit of Provisional Patent Application Ser. No. 60/196,831 filed Apr. 13, 2000.

The present invention is related to the following documents, all of which are assigned to the assignee of the present invention and which are specifically incorporated herein by reference:

Patent application Ser. No. 09/384,691, filed Aug. 27, 1999 by Brian Bass et al., entitled "Network Processor Processing Complex and Methods", sometimes referred to herein as the Network Processing Unit Patent or NPU Patent.

U.S. Pat. No. 5,724,348 entitled "Efficient Hardware/Software Interface for a Data Switch" issued Mar. 3, 1998, which patent is sometimes referred to herein as the Interface Patent.

Patent application Ser. No. 09/330,968 filed Jun. 11, 1999 and entitled "High Speed Parallel/Serial Link for Data Communications", sometimes referred to as the Link Patent.

Various patents and applications assigned to IBM for its multiprotocol switching services, sometimes referred to as "MSS", some of which include Cedric Alexander as an inventor, and are sometimes referred to as the MSS Patents.

Patent application Ser. No. 09/548,907 filed Apr. 13, 2000 by Brian M. Bass et al. and entitled "Method and System for Network Processor Scheduler". This patent is sometimes referred to herein as the Scheduler Structure Patent.

Patent application Ser. No. 09/548,910 filed Apr. 13, 2000 by Brian M. Bass et al. and entitled "Method and System for Network Processor Scheduling Outputs Based on Multiple Calendars". This patent is sometimes referred to herein as the Calendar Scheduling Patent.

Patent application Ser. No. 09/548,911 filed Apr. 13, 2000 by Brian M. Bass et al. and entitled "Method and System for Network Processor Scheduling Based on Calculation". This patent is sometimes referred to herein as the Calculation Patent.

Patent application Ser. No. 09/548,912 filed Apr. 13, 2000 by Brian M. Bass et al. and entitled "Method and System for Network Processor Scheduling Outputs Using Queuing". This patent is sometimes referred to herein as the Queuing Patent.

Patent application Ser. No. 09/548,913 filed Apr. 13, 2000 by Brian M. Bass et al. and entitled "Method and System for Network Processor Scheduling Outputs using Disconnect/Reconnect Flow Queues. This patent is sometimes referred to herein as the Reconnection Patent.

Patent application Ser. No. 09/546,651 filed April, 2000 by Peter I. A. Barri et al. and entitled "Method and System for Minimizing Congestion in a Network". This patent is sometimes referred to herein as the Flow Control Patent.

Patent application Ser. No. 09/547,280 filed Apr. 11, 2000 by M. Heddes et al. and entitled "Unified Method and System for Scheduling and Discarding Packets in Computer Networks". This patent is sometimes referred to herein as the Packet Discard Patent.

BACKGROUND OF THE INVENTION

1. Field of the Invention

The present invention relates to communication network apparatus such as is used to link together information handling systems or computers of various types and capabilities and to components and methods for data processing in such an apparatus. The present invention includes an improved system and method for scheduling the distribution of information units from a flow control system coupled to a plurality of network processing unit toward a data transmission network through a PMM and MAC. More particularly, the present invention involves scheduling using a plurality of algorithms to handle a plurality of users who are processing variable size information packets or frames, providing an order to the frames being provided from the flow control system (which may be of the type described in the referenced Flow Control Patent) toward the data transmission network. The present invention includes a system for establishing and enforcing different types of service levels for the flows of different users.

2. Background Art

The description of the present invention which follows is based on a presupposition that the reader has a basic knowledge of network data communications and the routers and switches which are useful in such network communications. In particular, this description presupposes familiarity with the International Standards Organization ("ISO") model of network architecture which divides network operation into layers. A typical architecture based on the ISO model extends from a Layer 1 (which is sometimes referred to as a "L1") being the physical pathway or media through which signals are passed upward through Layers 2 (or "L2"), 3 (or "L3"), and so forth to Layer 7 which is the layer of application programming resident in a computer system linked to the network. Throughout this document, references to such layers as L1, L2, L3 are intended to refer to the corresponding layer of the network architecture. The present description also is based on a fundamental understanding of bit strings used in network communication known as packets and frames.

Bandwidth considerations (or the amount of data which a system can handle in a unit of time) are becoming important in today's view of network operations. Traffic over networks is increasing, both in sheer volume and in the diversity of the traffic. At one time, some networks were used primarily for a certain type of communications traffic, such as voice on a telephone network and digital data over a data transmission network. Of course, in addition to the voice signals, a telephone network would also carry a limited amount of "data" (such as the calling number and the called number, for routing and billing purposes), but the primary use for some networks had, at one point in time, been substantially homogenous packets.

A substantial increase in traffic has occurred as a result of the increasing popularity of the Internet (a public network of loosely linked computers sometimes referred to as the worldwide web or "www.") and internal analogs of it (sometimes referred to as intranets) found in private data transmission networks. The Internet and intranets involve transmission of large amounts of information between remote locations to satisfy an ever-growing need for remote access to information and emerging applications. The Internet has opened up to a large number of users in geographically dispersed areas an exploding amount of remote information and enabled a variety of new applications, such as e-commerce, which has resulted in a greatly-increased load on networks. Other applications, such as e-mail, file transfer and database access further add load to networks, some of which are already under strain due to high levels of network traffic.

Voice and data traffic are also converging onto networks at the present time. Data is currently transmitted over the Internet (through the Internet Protocol or IP) at no charge, and voice traffic typically follows the path of lowest cost. Technologies such as voice over IP (VOIP) and voice over asynchronous transfer mode or ATM (VoATM) or voice over frame relay (VoFR) are cost-effective alternatives for transmission of voice traffic in today's environment. As these services migrate, the industry will be addressing issues such as the changing cost structure and concerns over the trade off between cost of service and quality of service in the transmission of information between processors.

Aspects of quality of service include the capacity or bandwidth (how much information can be accommodated in a period of time), the response time (how long does it take to process a frame) and how flexible is the processing (does it respond to different protocols and frame configurations, such as different encapsulation or frame header methods). Those using a resource will consider the quality of service as well as the cost of service, with the tradeoffs depending on the situation presented.

Some prior art systems handle outgoing information units from a processing system in a variety of ways. One suggestion is to use a round robin scheduler which fairness amongst a set of queues. Another one employs several different levels of priorities and a queue for each. In such a system, you have an absolute priority where the highest priority work is processed first and the lowest priority work may never be processed.

Still another method of scheduling outputs involves a plurality of prioritized lists of work to be processed.

It is also known to use a hierarchical packet scheduling system. There are even systems which use several different scheduling methods in determining the order in which information units are to be sent toward a data transmission network, using a combination of different scheduling techniques.

Other systems have used a weighted priority technique implemented in the form of a round robin—which serves all queues, with some queues served more frequently than other queues, based on an algorithm which defines the level of service. Even such a weighted priority system would provide service to a user who continually exceeds the service levels assigned to it, continuing to serve, albeit less often, even as it exceeds the assigned service level and making it difficult for the system to enforce a level of service policy.

Considering the size of a transmission packet or frame in determining which customers to serve adds a measure of fairness to a service system, in that a user who is processing large frames takes up more of the system capacity and therefore should receive service less often than a user with small frames. Some of the prior art systems consider the size of the transmission packet or frame in allocating resources, while others do not. Some communication systems use a uniform, fixed-size packet, making consideration of packet size unnecessary, but others do not consider the size of the packet in allocating resources.

Other prior art system are directed to handling information units which are of a common size as in the so-called Asynchronous Transfer Mode (or ATM) system, so that size of the information unit is not considered in determining the priority of the current or a future information unit. An ATM system with a weight-driven scheduler is one of the solutions which is known in the prior art to schedule outputs from an ATM system.

In any such system which involves weighting and queueing, it is desirable to allow for different types of service—for example, minimum bandwidth, best effort bandwidth, weighted fair queuing service, best effort peak bandwidth, and maximum burst size. While each of these types of service level are well known and accommodated in the prior art, it is a challenge to allow for the use of the any or all of them in the same system. It is also desirable to implement the weighted fair queuing using a system which considers the size of the transmission packet in determining the priority to be assigned to the packet in the queue.

Thus, the prior art systems for handling data packets for transmission to a network have undesirable disadvantages and limitations which have an effect on the perceived fairness of the system.

SUMMARY OF THE INVENTION

The present invention overcomes the disadvantages and limitations of the prior art systems by providing a simple, yet effective, way of handling information units or frames coming out of a processing system and directing frames to output ports for dispatch to an data transmission network while providing a variety of different type of service levels in the same system.

The present invention allows a single processing system to accommodate users which have service level agreements which include characteristics such as minimum bandwidth, best effort bandwidth, weighted fair queuing service, best effort peak bandwidth, and maximum burst size specifications, and any combinations of these characteristics in the same agreement.

The present invention has the advantage that it allows the efficient use of resources and requires a minimum overhead to accommodate the various types of service levels. The present system establishes the types of service level agreement characteristics (also referred to as QoS) and provides the mechanism for enforcing them through manipulation of flow queues within a combination of time based calendars and weighted fair queuing calendars. The present invention also uses a technique for enforcing a level of service characteristic (for example, a minimum bandwidth) by determining the earliest time for the next service as a result of the current service, then testing the next request for service to determine whether it is after the allowable time for the next service based on the bandwidth established for the user.

The present invention also allows for the use of any unused bandwidth by others through the use of a weighted fair queuing system which allows for the individual users to compete on a weighted fair basis for bandwidth which is unused at any given time. That is, even if bandwidth has been established for a user (for example, a user with a minimum bandwidth), when that bandwidth is not being used for that user, it may be used by others.

The system and method of the present invention allows for the fair use of the unused bandwidth by considering the size of the packet when determining the service order. That is, a user who sends a large packet is serviced later in the queue for unused bandwidth than a user who sends a small packet.

The method to accomplish different levels of service is accomplished by establishing different calendars, both time based and weighted fair queuing and assigning flow queues to locations in one or more calendars. The calendars selected are determined based on the service level agreement which has been requested and paid for. Then, a user who has paid for a minimum bandwidth receives priority over others while that user is operating within and does not exceed that bandwidth. To the extent that the user with a minimum bandwidth exceeds that bandwidth, then the user may compete with other users for weighted fair use bandwidth allocation according to his service level agreement using a method which considers the length of the transmission packet. Similarly, a user who has arranged for a best effort bandwidth is provided with that bandwidth to the extent that it is available and a user who has arranger for best effort peak bandwidth or maximum burst size service is accorded the services in the system for allocating bandwidth of the present invention.

Other objects and advantages of the present invention will be apparent to those skilled in the relevant art in view of the following description of the preferred embodiment, taken together with the accompanying drawings and the appended claims.

BRIEF DESCRIPTION OF THE DRAWINGS

Having thus set forth some of the limitations and disadvantages of the prior art and some objects and advantages of the present invention, other objects and advantages will be apparent to those skilled in the relevant art in view of the following description of the drawings illustrating the present invention of an improved routing system and method in which.

DETAILED DESCRIPTION OF THE PREFERRED EMBODIMENT

In the following description of the preferred embodiment, the best implementations of practicing the invention presently known to the inventors will be described with some particularity. However, this description is intended as a broad, general teaching of the concepts of the present invention in a specific embodiment but is not intended to be limiting the present invention to that as shown in this embodiment, especially since those skilled in the relevant art will recognize many variations and changes to the specific structure and operation shown and described with respect to these figures.

Figure 1:
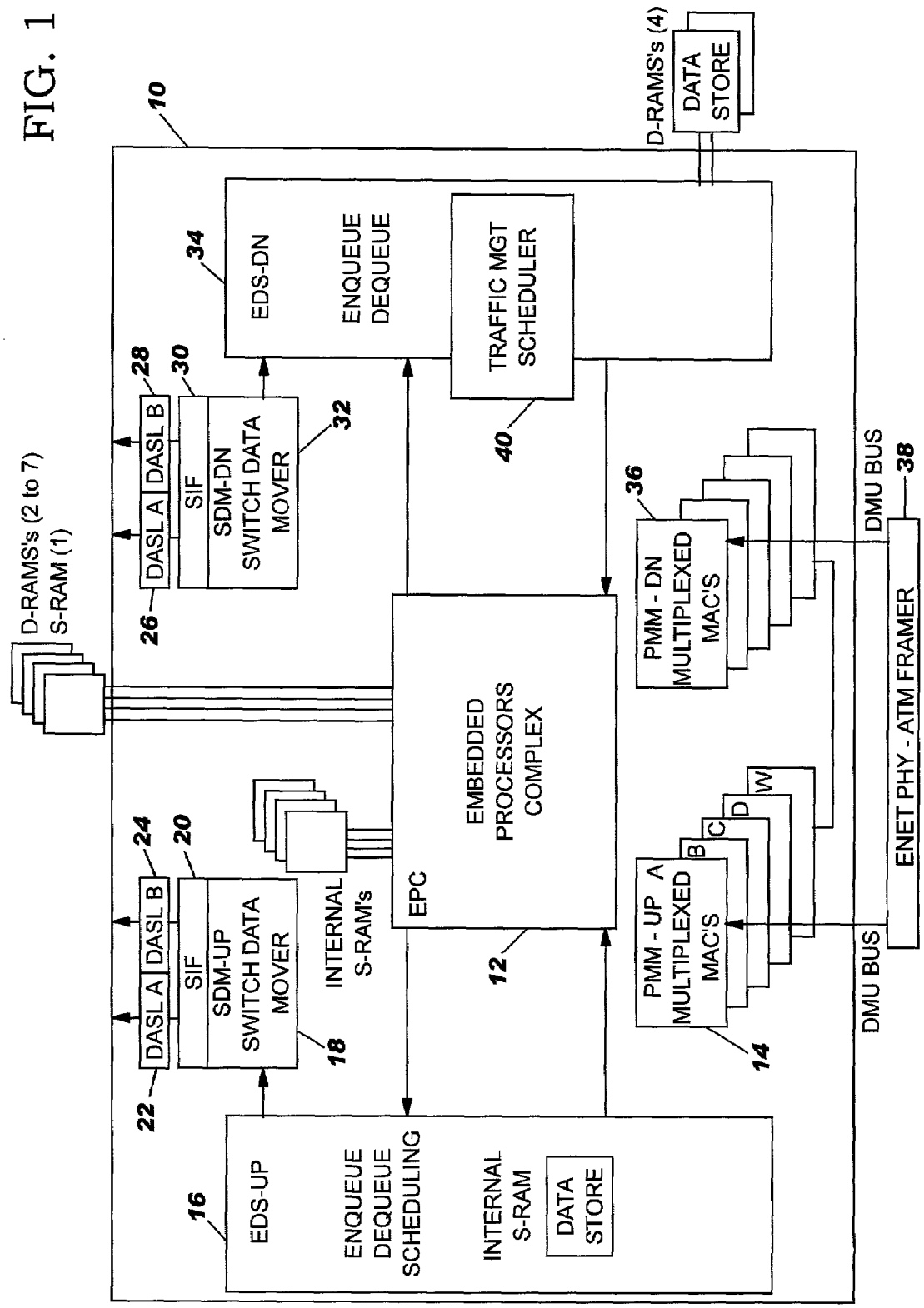
FIG. 1 is a block diagram for an interface device including embedded processor complex which is described in the NPU Patent, showing a DN Enqueue system and scheduler useful in practicing the present invention.

FIG. 1 shows a block diagram of the interface device chip that includes the substrate 10 and a plurality of subassemblies integrated on the substrate. The subassemblies are arranged into an upside configuration and a downside configuration, with the "upside" configuration (sometimes also referred to as an "ingress") referring to those components relating to data inbound to the chip from a data transmission network (up to or into the chip) and "downside" (sometimes referred to as an "egress") referring to those components whose function is to transmit data from the chip toward the data transmission network in an outbound fashion (away from the chip or down and into the network). Data flows follow the respective arrangements of the upside and downside configurations; thus, there is a upside data flow and a downside data flow in the system of FIG. 1. The upside or ingress configuration elements include an Enqueue-Dequeue-Scheduling UP (EDS-UP) logic 16, multiple multiplexed MAC's-UP (PMM-UP) 14, Switch Data Mover-UP (SDM-UP) 18, System Interface (SIF) 20, Data Align Serial Link A (DASL-A) 22 and Data Align Serial Link B (DASL-B) 24. Data links are more fully described in the Link Patent referenced above, and reference should be made to that document for a greater understanding of this portion of the system. It should be understood that the preferred embodiment of the present invention uses the data links as more fully described in that patent, other systems can be used to advantage with the present invention, particularly those which support relatively high data flows and system requirements, since the present invention is not limited to those specific auxiliary devices such as the data links which are employed in the preferred embodiment.

The components depicted on the downside (or egress) of the system include data links DASL-A 26 and DASL-B 28, system interface SIF 30, switch data mover SDM-DN 32, enqueue-dequeue-scheduler EDS-DN 34 and multiple multiplexed MAC's for the egress PMM-DN 36. The substrate 10 also includes a plurality of internal static random access memory components (S-RAM's), a traffic management scheduler (TRAFFIC MGT SCHEDULER, also known as the Egress Scheduler) 40 and an embedded processor complex 12 described in greater depth in the NPU Patent referenced above. An interface device 38 is coupled by the respective DMU busses to PMM 14, 36. The interface device 38 could be any suitable hardware apparatus for connecting to the L1 circuitry, such as Ethernet physical (ENET PHY) devices or asynchronous transfer mode framing equipment (ATM FRAMER), both of which are examples of devices which are well known and generally available for this purpose in the trade. The type and size of the interface device are determined, at least in part, by the network media to which the present chip and its system are attached A plurality of external dynamic random access memory devices (D-RAMS) and a S-RAM are available for use by the chip.

While here particularly disclosed for networks in which the general data flow outside the relevant switching and routing devices is passed through electric conductors such as wires and cables installed in buildings, the present invention contemplates that the network switches and components thereof could be used in a wireless environment as well. For example, the media access control (MAC) elements herein disclosed may be replaced with suitable radio frequency devices, such as those made from silicon germanium technology, which would result in the connection of the device disclosed directly to a wireless network. Where such technology is appropriately employed, the radio frequency elements can be integrated into the VLSI structures disclosed herein by a person of skill in the appropriate arts. Alternatively, radio frequency or other wireless response devices such as infrared (IR) response devices can be mounted on a blade with the other elements herein disclosed to achieve a switch apparatus which is useful with wireless network apparatus.

The arrows show the general flow of data within the interface system shown in FIG. 1. Frames of data or messages (also sometimes referred to as packets or information units) received from an Ethernet MAC 14 off the ENET PHY block 38 via the DMU bus are placed in internal data store buffers 16a by the EDS-UP device 16. The frames may be identified as either normal frames or guided frames, which then relates to method and location of the subsequent processing in the plurality of processors. After the input units or frames are processed by one of the plurality of processors in the embedded processor complex, the completed information units are scheduled through the scheduler 40 out of the processing unit 10 and onto the data transmission network through the PMM-DN multiplexed MAC's 36 and the physical layer 38.

Figure 2:
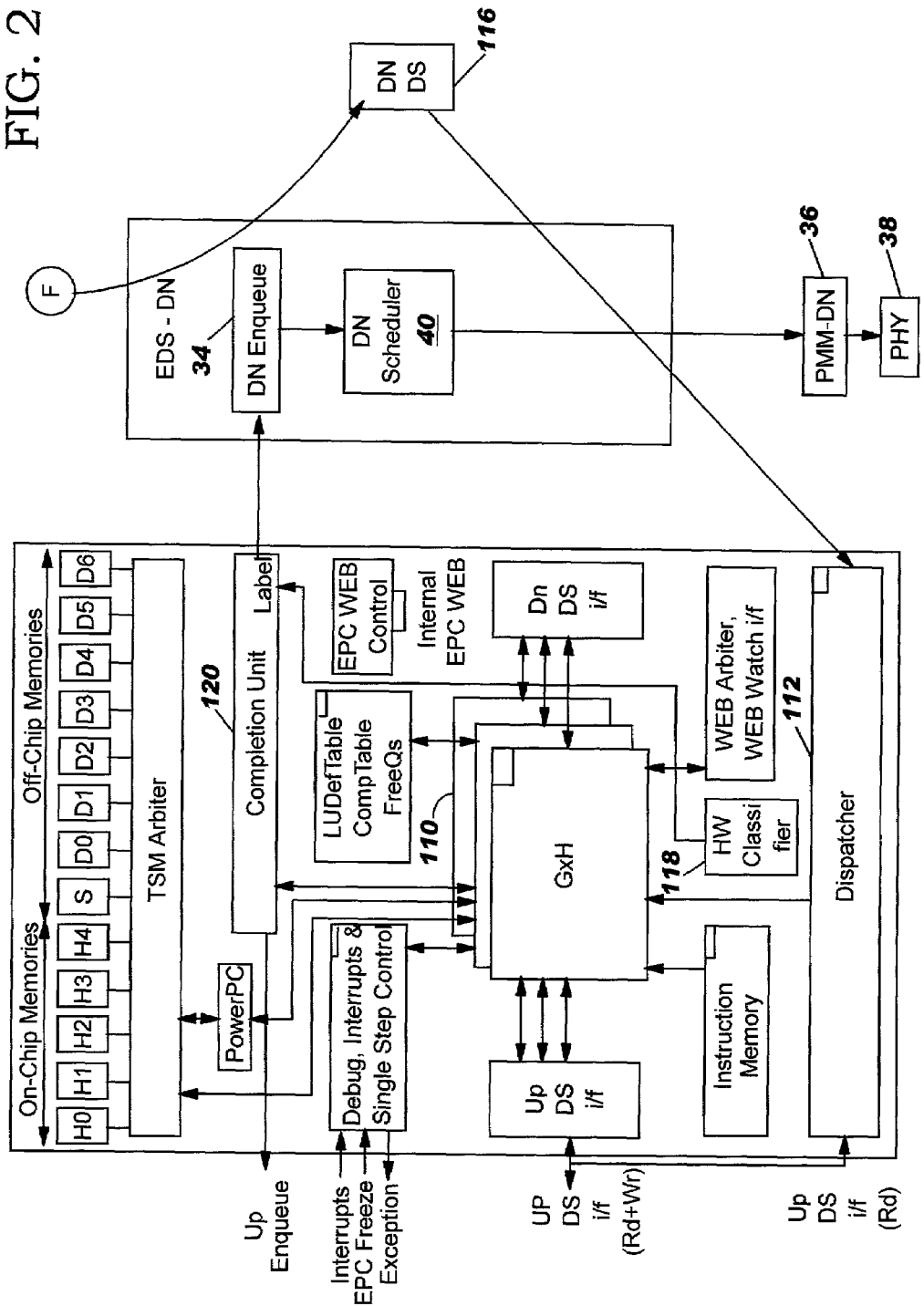
FIG. 2 is a block diagram of an embedded processor complex of type shown in FIG. 1, with the DN Enqueue (and its included scheduler) useful in understanding the present invention.

FIG. 2 is a block diagram of a processing system 100 which can employ the present invention to advantage. In this FIG. 2, a plurality of processing units 110 are located between a dispatcher unit 112 and a completion unit 120. Each incoming frame F (from a switch, not shown, attached to the present data processing system) is received and stored into an DOWN data store (or DN DS) 116, then sequenfially removed by the dispatcher 112 and assigned to one of the plurality of processing units 110, based on a determination by the dispatcher 112 that the processing unit is available to process the frame. Greater detail on the structure and function of the processing units 110 in particular, and the processing system in general, can be found in the NPU Patent references above and patent applications and descriptions of the individual components such as a flow control device detailed in the Flow Control Patent. Interposed between the dispatcher 112 and the plurality of processing units 110 is a hardware classifier assist 118 which is described in more detail in a pending patent application Ser. No. 09/479,027 filed Jan. 7, 2000 by J. L. Calvignac et al. and assigned to the assignee of the present invention, an application which is incorporated herein by reference. The frames which are processed by the plurality of network processors 110 go into a completion unit 120 which is coupled to the DN Enqueue 34 through a flow control system as described in the Flow Control Patent and the Packet Discard Patent. The DN Enqueue 34 is coupled to the Dn Scheduler which is coupled through the PMM DN MAC's 36, then by the DMU data bus to the physical layer 38 (the data transmission network itself).

Figure 3:
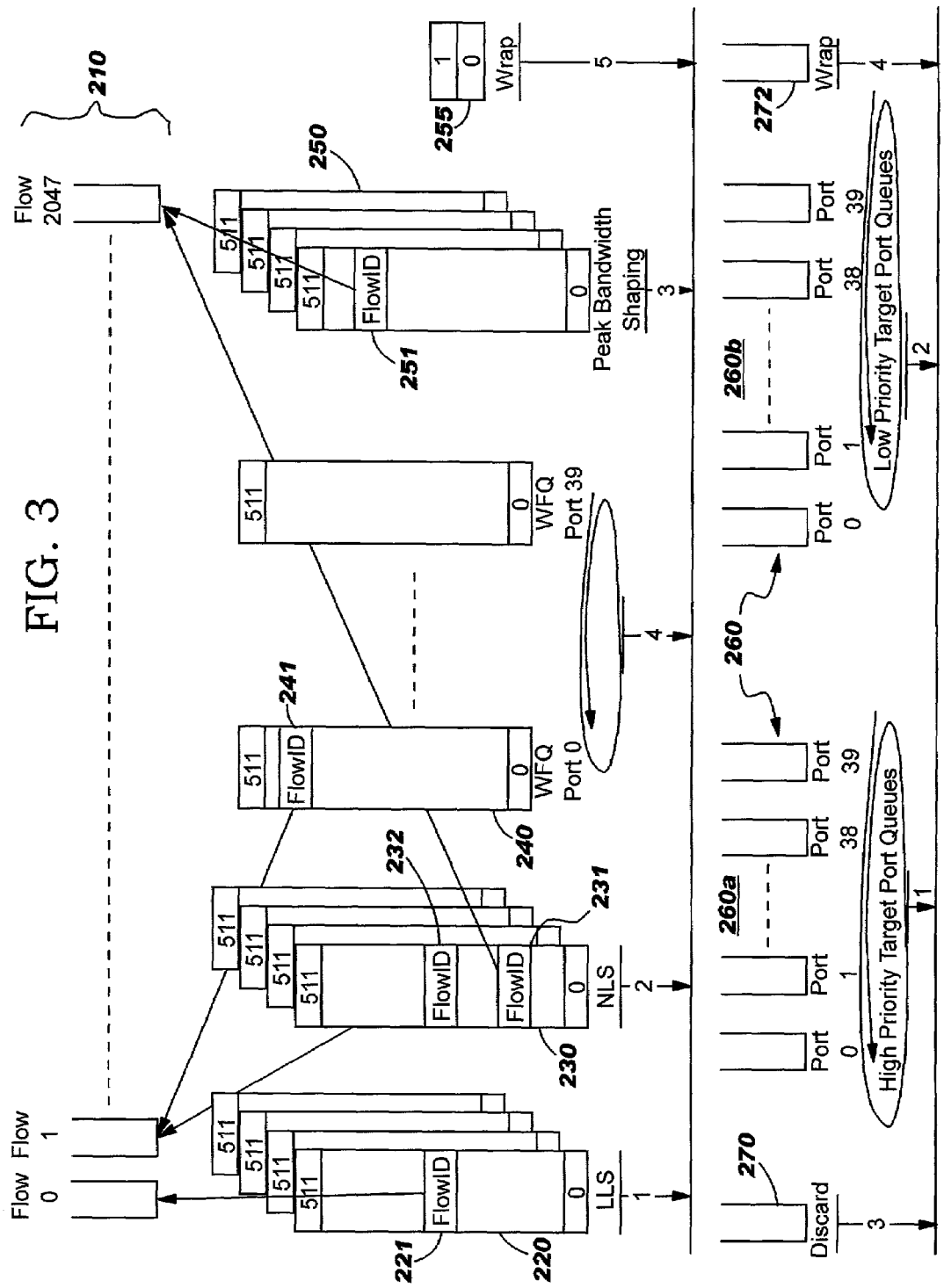
FIG. 3 illustrates the scheduler of FIGS. 1–2, illustrating a system for scheduling egress of variable length packets according to the preferred embodiment of the present invention, in an "egress scheduler"

The egress scheduler 40 of FIG. 3 provides a structure and method of operation which permits the functions of scheduling frame transmission from a network processing unit to a data transmission network in accordance with a minimum bandwidth algorithm, peak bandwidth algorithm, weighted fair queueing techniques and maximum burst size scheduling in a single unified scheduler system. It is described more fully in the Scheduler Structure Patent referenced above.

The scheduler system illustrated in FIG. 3 is comprised of a plurality of flows 210, time-based calendars 220, 230, 250, weighted fair queuing (WFQ) calendars 240 and target port queues 260.

The flows 210 and their operation are described in more detail in the referenced Flow Control Patent and the referenced Packet Discard Patent. The flows 210 are control structures that are used to maintain ordered lists of frames which share common system characteristics based on assignment, that is, the level of service that the associated user has selected and paid for. These characteristics include minimum bandwidth, peak bandwidth, best effort bandwidth and maximum burst size quality of service (QoS) requirements. In addition to flow queues set up for the purpose of supporting QoS for communication systems, the preferred embodiment requires flow queues define for the purpose of discarding frames (i.e. filtered traffic), and the wrapping of frame data from the egress to the ingress of the network processor system.

Time-based calendars 220, 230, 250 are used for scheduling packets with minimum bandwidth and best effort peak rate requirements. As shown in FIG. 3, three time based calendars are used for this purpose: two calendars 220, 230 for minimum bandwidth and a third calendar 250 used to limit flow queues to a maximum best effort peak rate (peak bandwidth shaping). Two time-based calendars 220, 230 (one calendar 220 identified as low latency service or LLS and the other calendar 230 identified as normal latency service or NLS) provide for minimum bandwidth allow support of different classes of service within a minimum bandwidth QoS class (i.e., low latency and normal latency).

Weighted fair queuing (WFQ) calendars 240 are used for best effort service, and best effort peak service (when used in combination with one of the time-based calendar 250). Further, the WFQ calendars 240 support a queue weight that allows support of different classes of service within a best effort service QoS class. In the preferred embodiment there are 40 such WFQ calendars, corresponding to the number of supported media ports (output ports). The selection of 40 such ports is a trade off between hardware cost and design complexity and is not intended to limit the scope of the invention.

In each of the above mentioned calendars, a pointer (a Flow ID) is used to represent a flow queue's location within the calendar. Thus, flow 0 has its Flow ID at 221 in calendar 220, flow 1 has its FlowID at 232 in calendar 230 and at 241 in the WFQ calendar 240 and flow 2047 has its FlowID at 231 in calendar 230 and at 251 in calendar 250, all as indicated by the arrows in FIG. 3. Further there may be none, one, or two such pointers to a single flow queue present in the plurality of calendars in the system. Typically, pointers in a calendar do not represent un-initialized or empty flow queues. When a pointer to a flow queue (or a FlowID) is present in a particular calendar in the system, the flow queue may be referred to as being "in" that particular calendar.

Target port queues are control structures used to maintain ordered lists of frames that have common port destination and priorities. In the preferred embodiment, 2 priorities per media port (or output part) are provided to allow support of different classes of service, a so-called high priority target part queue and a so-called low priority target port queue. The selection of 2 priorities is a trade off between hardware cost and design complexity and is not intended to limit the scope of the invention. Further, the preferred embodiment includes a separate wrap queue 272 and a discard port queue 270.

Figure 4:
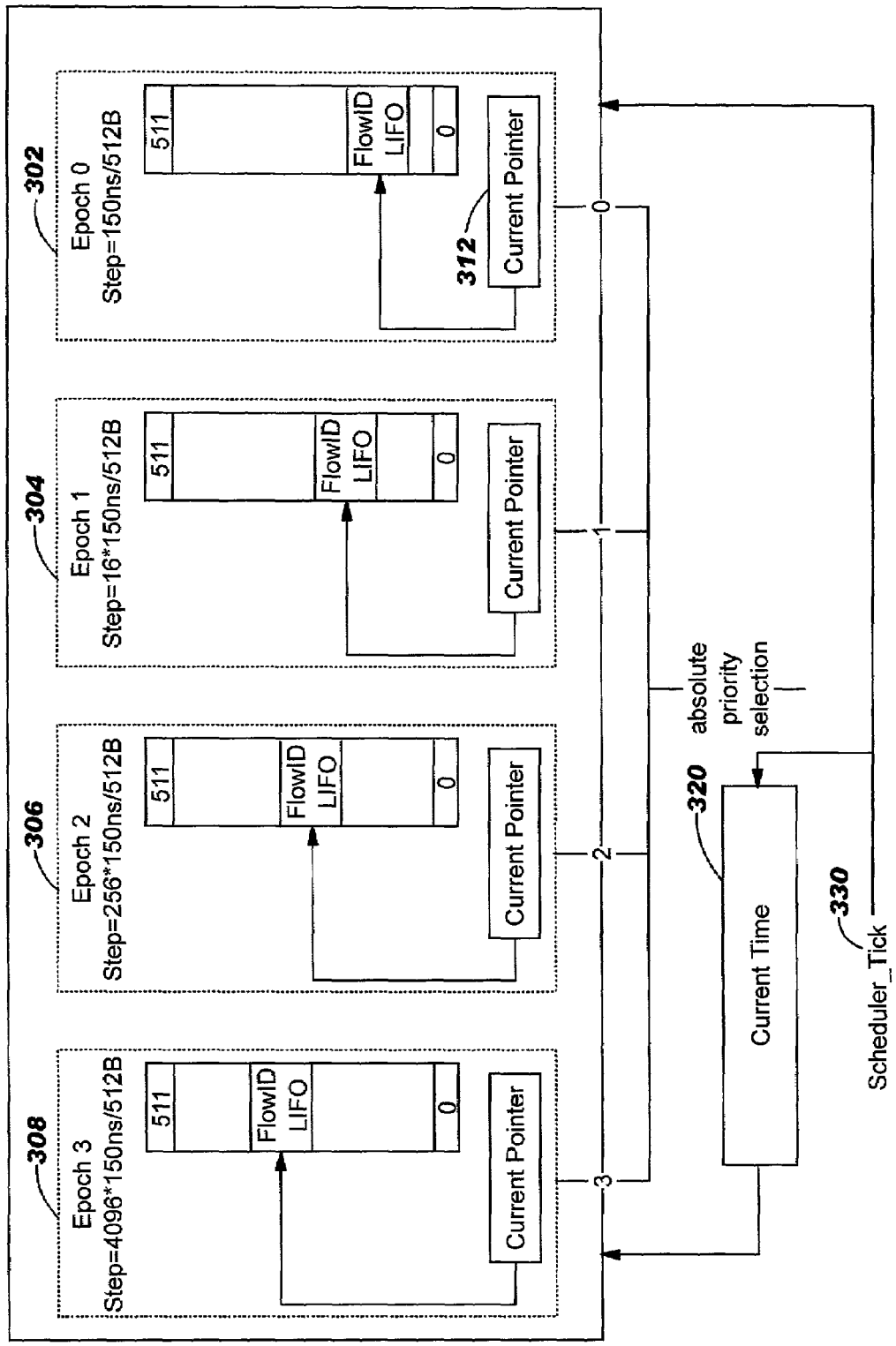
FIG. 4 illustrates timer base calendar according to the preferred embodiment.

Each of the time-based calendars 220, 230 and 250 consists of a plurality of epochs, with four shown for each in FIG. 3 as represented by the overlapping rectangles. FIG. 4 shows the four epochs 302, 304, 306 and 308 along with a typical timing arrangement for the epochs where the first epoch 302 (labeled epoch0) has a step of the scheduler tick (150 nsec in this case divided by 512 Bytes), the second epoch 304 has a step of 16 times that of the first epoch 302, with the third epoch 306 having the same ratio to the second epoch 304 and the fourth epoch 308 having the same ratio to the third epoch 306. In this way, the first epoch 302 has a high priority (it is scheduled for service sixteen times as often as the second epoch 304), creating a hierarchy of service priorities which will have associated increases in cost. A current pointer (e.g, 312 for epoch 302) is associated with each epoch to provide a pointer as to where in the calendar the processing is currently located. Since the arbitrary system of processing through the epochs is to increment the current pointer, the direction of processing is from lower to higher in the epoch. Also shown in this FIG. 4 is the current time 320 and a scheduler tick 330 which drives the clock 320 as well as the priority selection.

The priority selection is an absolute priority selection, which means that since only one can be serviced during any interval, the one with the highest priority is serviced. If the current pointer in each of the epochs points to a calendar entry with a Flow ID, the lowest one (epocho) will be serviced. If epoch 0 requires no service (no Flow ID is present at that location), then epoch 1 is serviced, then epoch 2, etc.

FIGS. 5–8 illustrate the process and system of enqueuing packets into the scheduler system according to the preferred embodiment of the present invention. This method and system are described in some detail in the incorporated documents references above, particularly the Scheduler Structure Patent, and the reader is referred to that patent for a fuller description of the process of enqueuing packets.

FIGS. 9–13 illustrate the logic and calculations performed by the egress scheduler to provide an interaction between different calendars to provide minimum bandwidth, best effort bandwidth, weighted fair queuing service for use of the shared bandwidth of the bandwidth left over from serving customer with minimum bandwidth, peak bandwidth and maximum burst size bandwidth.

The present invention uses a plurality of different queues for receiving and scheduled for output based on The type of service which has been associated with a given flow of processed frames. That is, for each flow or origination of frames, a level of service type (service level agreement or SLA) has been established, often as a result of a payment for a given type and level of service. Some users wish to have an assigned minimum bandwidth while others are happy with a best efforts bandwidth. Because of differences in desirability of different types of service (and different levels of service within a type), different costs are associated with the service and some users are willing to pay a premium for a minimum bandwidth while other users are seeking a more economical service and are willing to accept a lesser service such as best efforts bandwidth or a weighted fair queuing system. The present invention associates with each SLA and user a queue (flow queue as discussed above) with the necessary characteristics that define the SLA and the queue's interaction with the various calendars (eg, which calendars are used for the service, the number of calendars and the scheduling within each calendar). The basic characteristics (minimum bandwidth, best effort WFQ, best effort peak bandwidth, and maximum burst size requires a method that allows the time based calendars and the WFQ calendars to interact with a single flow queue to provide the desired SLA characteristics (i.e. minimum bandwidth with best effort peak. Other combinations are discussed in the Scheduler Structure Patent. These interactions are described below.

Figure 5:
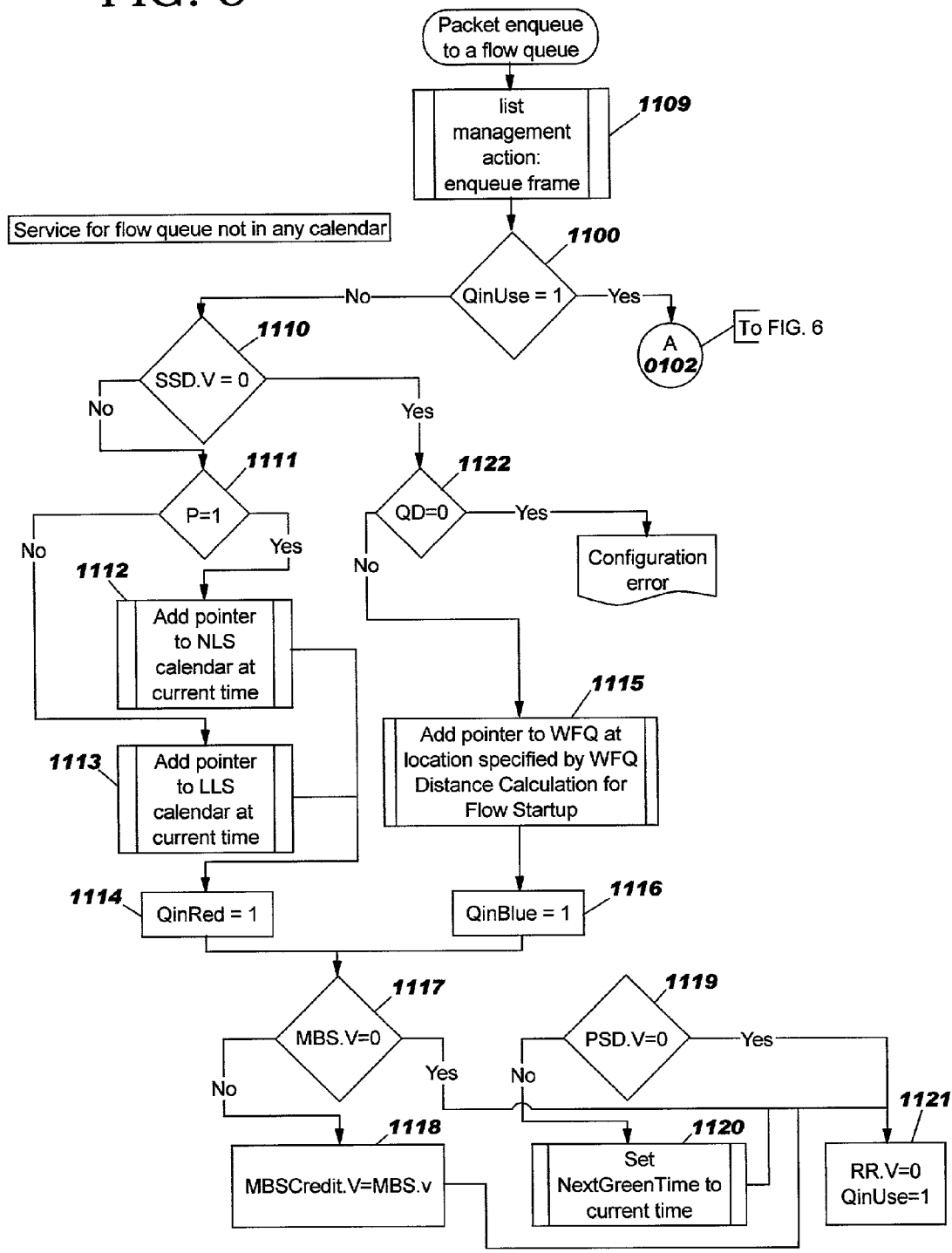
FIGS. 5–8 illustrates the method and system for enqueuing packets into the scheduler system.
Figure 6:
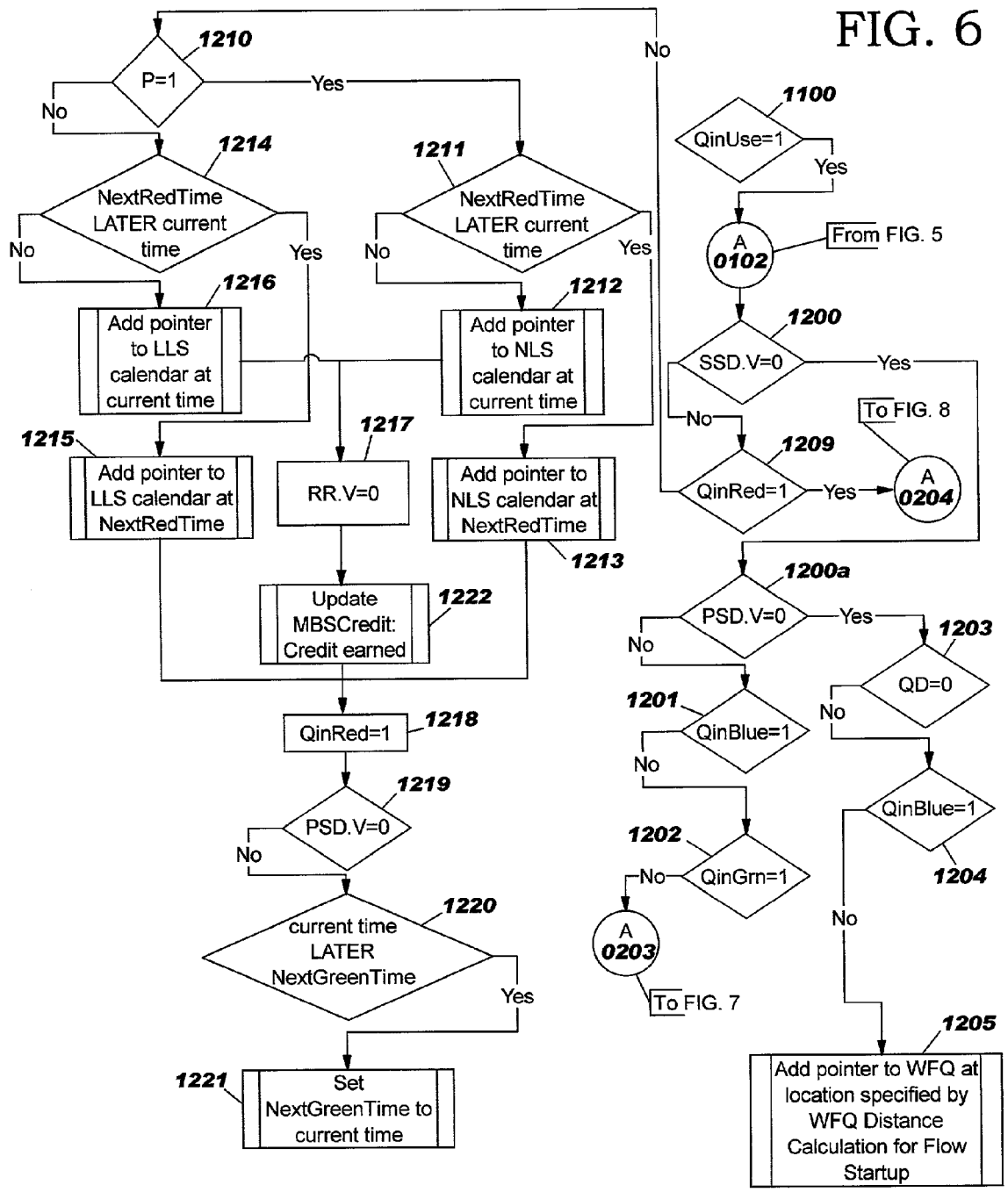
Figure 7:
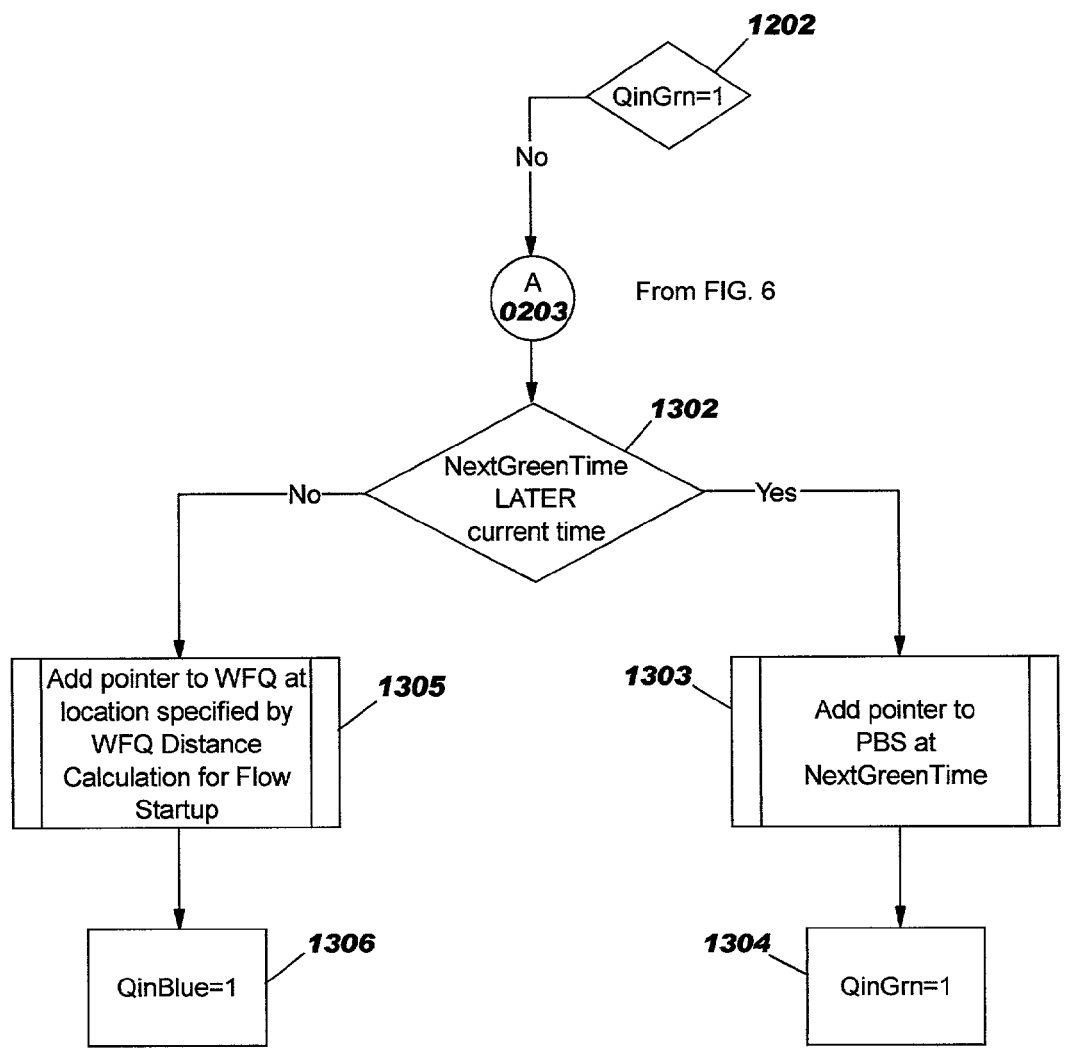
Figure 8:
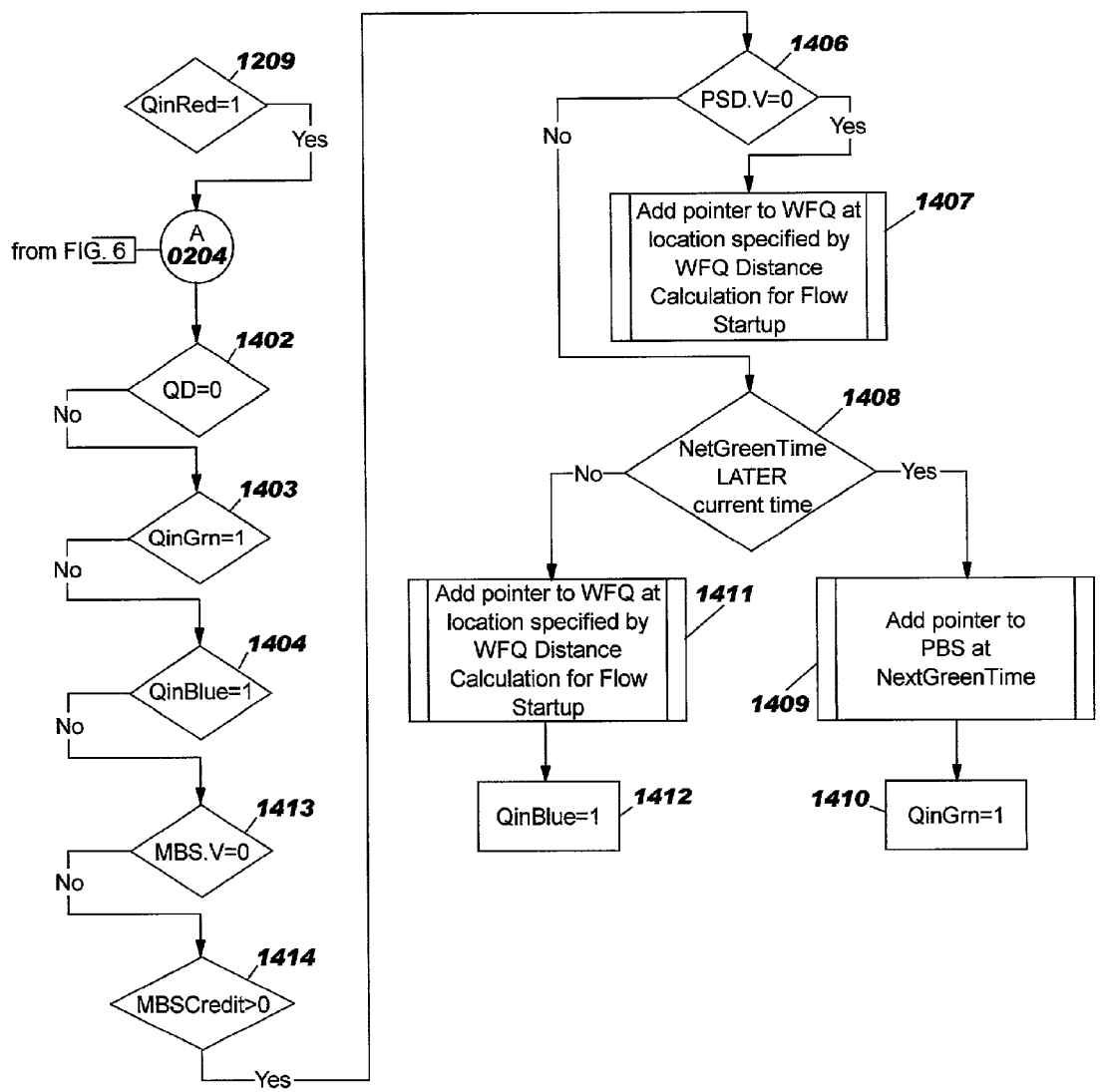

FIGS. 5–8 illustrates a packet enqueue when a packet is enqueued to a flow queue. FIG. 5 illustrates service for a flow queue not in any calendar. FIG. 6 illustrates the processing when timestamps are valid but the flow queue is not in all of the calendars it needs to be in. FIG. 7 is for a flow queue where there is no minimum bandwidth component and the peak component is not in a calendar. FIG. 8 illustrates a flow queue where the peak is not in the calendar but an minimum bandwidth component is in a calendar.

FIG. 5 begins with a packet enqueue to a flow queue and at block 1109 a list management action occurs to enqueue the frame. At block 1100, where Q is in use (Qinuse=1) is tested to indicate whether the flow is in any calendar. If so, then control passes to location 0102A (see FIG. 6), if not, to block 1110 where the SSD.V is tested as equal to 0. If so, then QD is tested for 0 at block 1122 and, if it is a configuration error is identified, other wise a pointer to the WFQ queue is add at a location specified by a WFQ distance calculation at block 1115 for flow startup and QinBlue is set to 1 at block 1116, indicating that this is part of a blue or WFQ calendar. If SSD.V was not zero at block 1110, the block 1111 then the value P is used to determine which calendar in which to include the flow—if P=1, then at block 1112 a pointer is added to the NLS calendar, if not, to the LLS calendar at block 1113. In any case, the calendar uses the current time and at block 1114 the flag QinRed is set to indicate that this is in the NLS or LLS calendar. Block 1117 follows from either block 1114 or 1116 and tests whether MBS.V (for maximum burst size service) is equal to zero. If this is zero (for no maximum burst size service), then the processing for this flow queue is complete at block 1121 with RR.V set to 0 and QinUse set to 1. If maximum burst size was not zero at block 1117, then the credit is updated at block 1118 before passing to block 1121. From block 1116, if PSD.V is not zero (tested at block 1119), then the NextGreenTime is set to the current time at block 1120 before passing to block 1121.

If a flow queue was determined in block 1100 FIG. 5 to be in a calendar, then at FIG. 6 it is determined whether the flow queue is in all of the calendars it needs to be in. If SSD.V is set to indicate that there is a minimum bandwidth component (No from block 1200) and QInRed is set to 1 (at block 1209), then control passes to FIG. 8 where the flow is enqueued to a calendar for best effort peak service. FIG. 7 is invoked if SSD.V is 0 at block 1200 and PSD.V is not zero at block 1200a and QinBlue and QinGm are both not set (blocks 1201 and 1202). A pointer to the WFQ at a location calculated using the Calculation Patent is added if PSD.V is zero (at block 1200a) and QD is not zero, indicating a best effort, WFQ, component (at block 1203) and QinBlue is not set (at block 1204).

If QinRed is not set at block 1209) then the NextRedTime is compared with the current time at blocks 1214 and 1211 to determine if service is due given the minimum level of minimum bandwidth service set for the flow. If the NexTRedTime is not later than the current time, then a pointer at the current time is added to the appropriate calendar at block 1216 or block 1212, depending on the value of P tested at block 1210 (if P=1, then normal latency service (NLS) is provided, if P is not equal to 1, then low latency service (LLS) applies. Similarly, if the NextRedTime is later than the current time, at blocks 1215 and 1213 a pointer is added to the appropriate calendar based on the value of P.

From blocks 1212 and 1216, the RR.V value is set to zero at block 1217 and the MBSCredit value is updated at block 1222. Then at block 1218, QinRed is set to 1 and at block 1221 the NextGreenTime is set to the current time value at block 1221 if PSD.V is not zero and the current time is later than the NextGreenTime.

FIG. 7 illustrates the processing where the peak component is not in a calendar and there is no minimum bandwidth component. This occurs as a result of the processing in FIG. 6, the output of block 1202. The NextGreenTime value is compared with the current time at block 1302 and, if it is later, then at block 1303, a pointer is added to the PBS calendar at the NextGreenTime (when it is eligible for service) and QinGrn flag is set. If the NextGreenTime value is not later than the current time at block 1302, then this flow is eligible for service at this time and block 1305 adds a pointer to the WFQ at a location specified by the WFQ distance calculation as specified by the Calculation Patent and block 1306 sets the flag for the QinBlue.

FIG. 8 illustrates the processing where the minimum bandwidth component is in a calendar but the peak is not in the calendar and involves examining the NextGreenTime stamp to determine whether to attach this to the WFQ or the PBS calendar. If MBS (Maximum Burst Size) is specified for this flow, then the MBS credit is examined and, if positive, this flow is added to the flow queue of either the WFQ or the PBS calendar. This results from the test of FIG. 6 at block 1209 and involves tests to determine that QD is not equal to 0 (at block 1402), that the QinGrn flag and the QinBlue flag have not been set (at blocks 1404 and 1405), that MBS.V is set indicating that there is a maximum burst size component at block 1413 and that the associated credit is positive at block 1414. If so, then the flow is either added to the WFQ (at block 1411) or the PBS (at block 1409) and the appropriate flag is set at block 1412 (blue for the WFQ) or at block 1410 (green for the PBS), depending on whether the NextGreenTime is later than the current time (tested at block 1408). If PSD.V is 0 at block 1406, then a pointer is added to the WFQ at a location specified by the Calculation Patent at block 1407.

Figure 9:
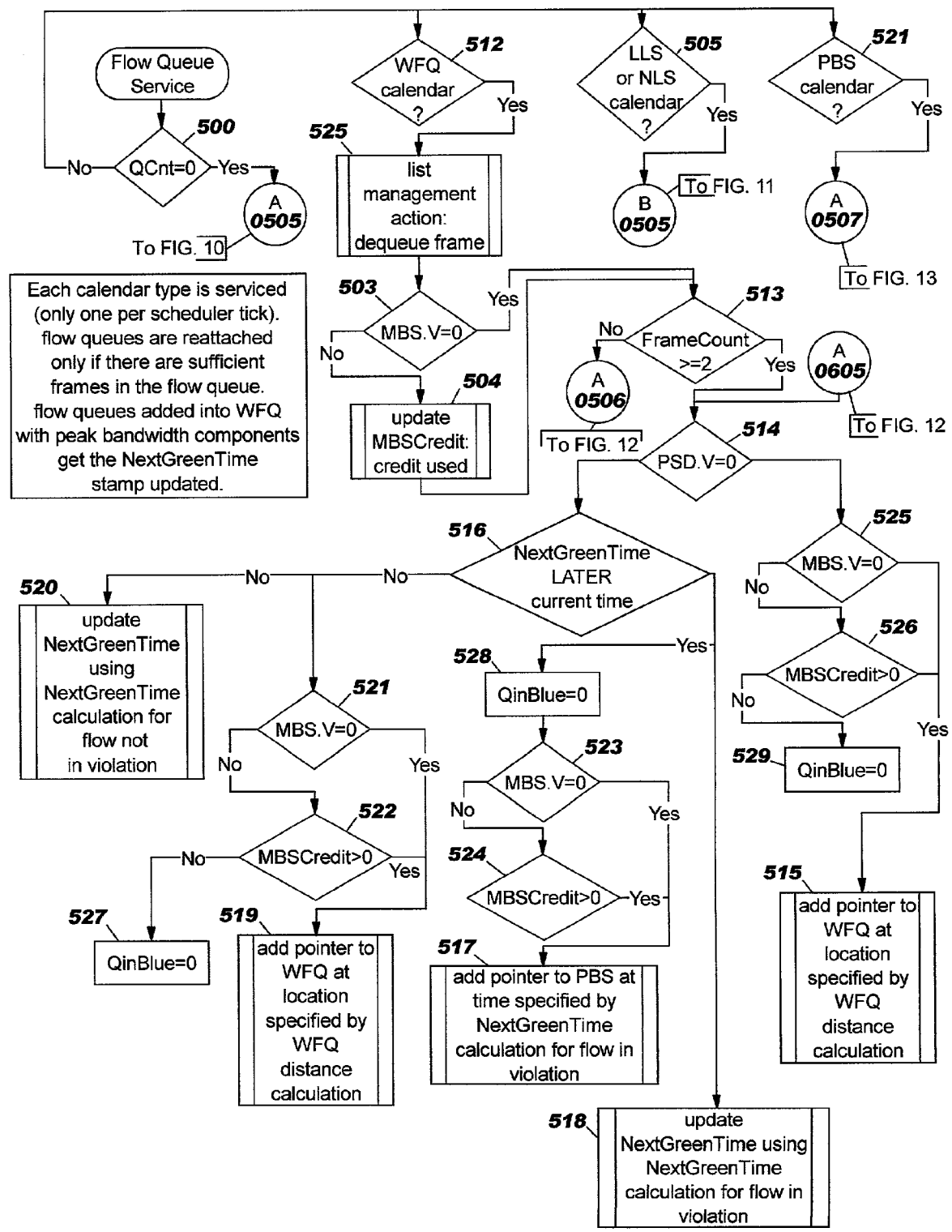
FIGS. 9–13 are logic flow charts of the calculations performed in the egress scheduler of the present invention, illustrating the servicing of a selected flow queue and calendar using the system of the present invention to provide minimum bandwidth, best effort bandwidth, weighted fair queuing service, best effort peak bandwidth and maximum burst size specifications, as different method of sharing bandwidth among users.
Figure 10:
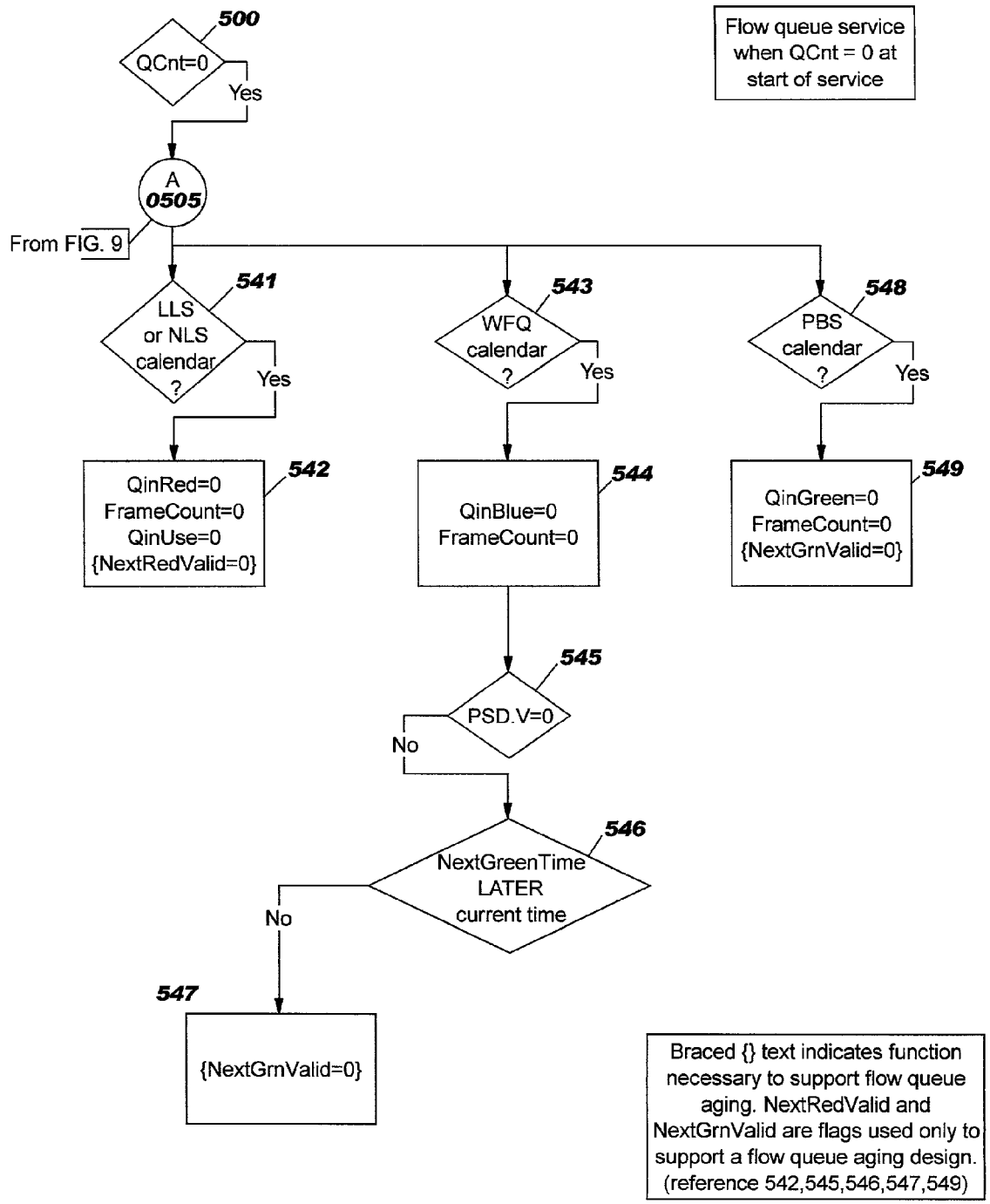
Figure 11:
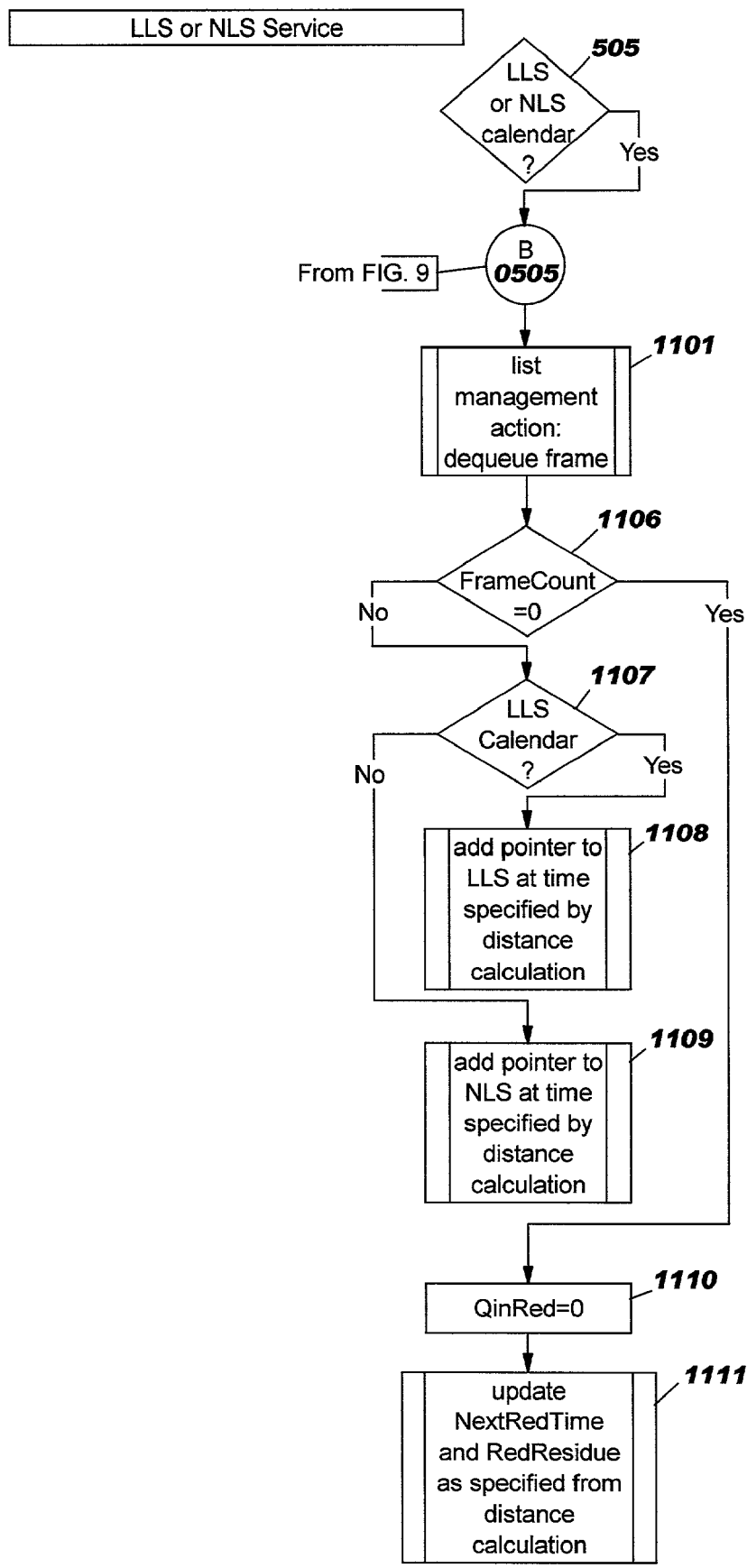
Figure 12:
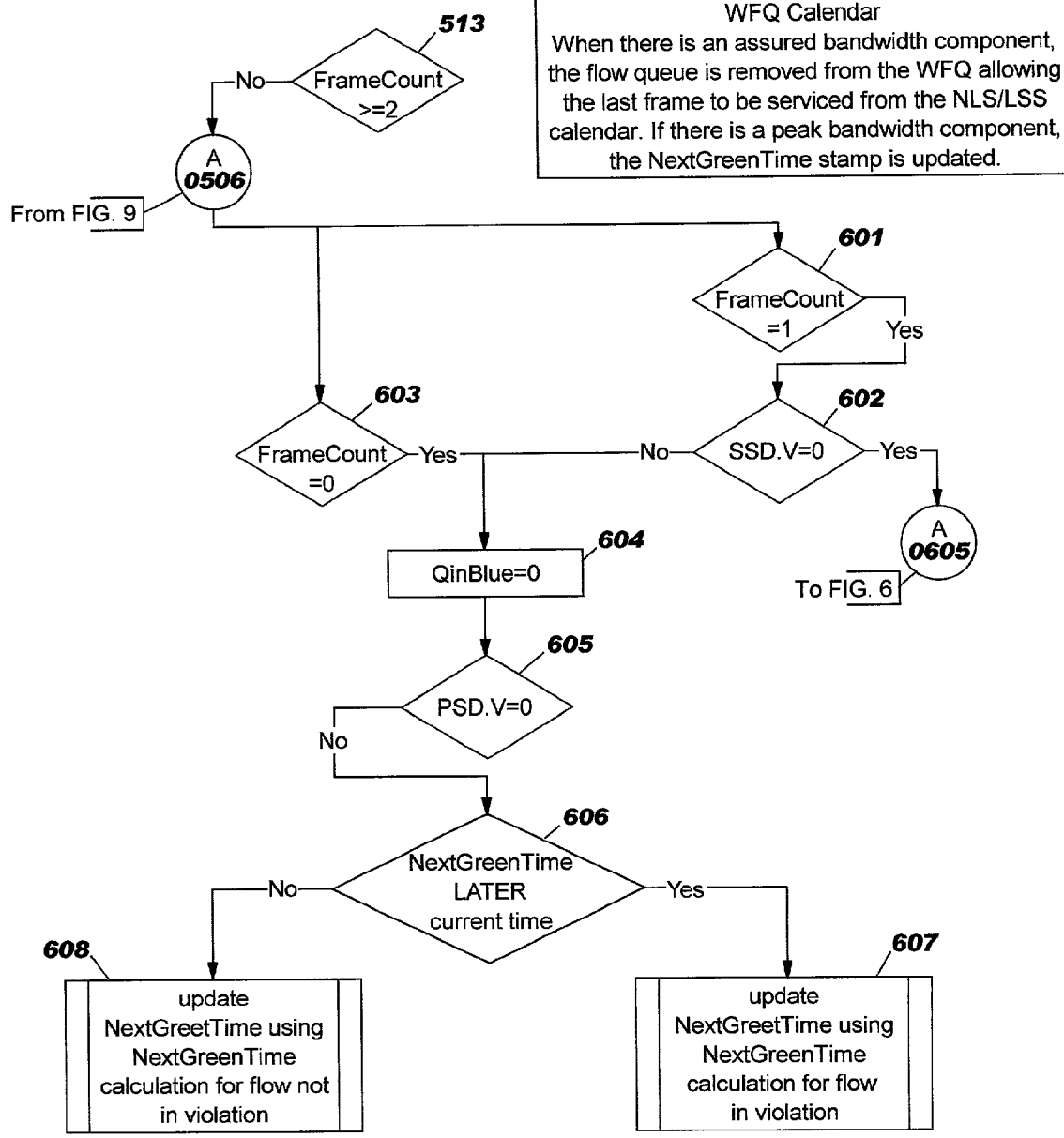
Figure 13:
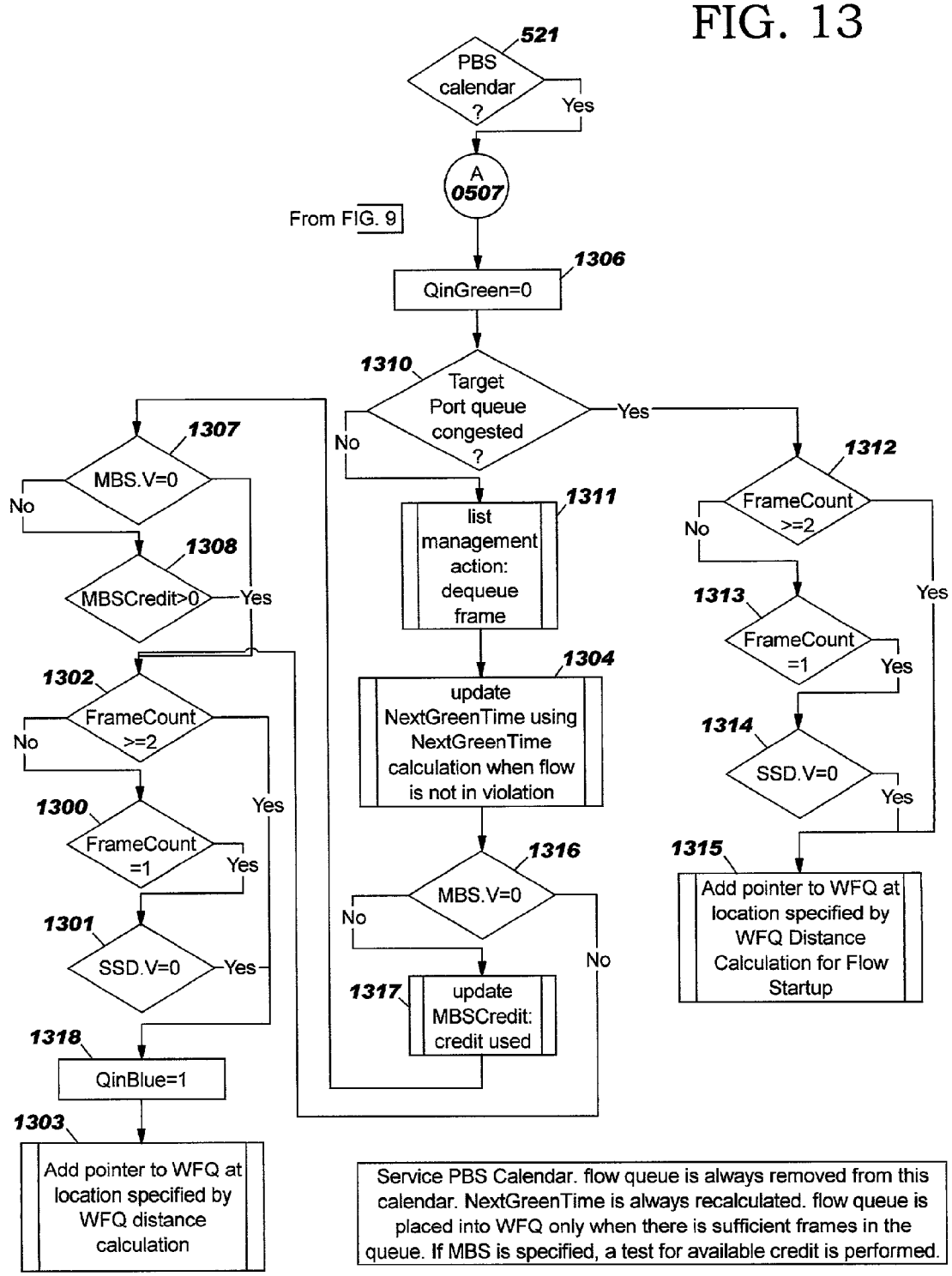

FIGS. 9–11 illustrate the processing of a flow queue that has been selected. The selection process is described in the Scheduler Structure Patent. The result of this process is a flow queue that is to be serviced, the calendar that the flow queue was found, as well as the location it was found. Information about the packet is obtained from the flow queue itself and other control structures (also described in the Scheduler Structure Patent). FIG. 9 illustrates that each calendar type is serviced (only one per scheduler tick), with flow queues reattached only if there are sufficient frames in the flow queue. Flow queues added to the weighted fair queuing (WFQ) with peak bandwidth components get the NextGreenTime stamp updated. FIG. 10 illustrates the flow queue service when the queue was empty (QCnt=0) at the start of service. FIG. 11 illustrate Low Latency (or Low Latency Sustainable) (LLS) or Normal Latency (or Normal Latency Sustainable) (NLS) service calendar. FIG. 12 illustrates the Weighted Fair Queuing (WFQ) service calendar. FIG. 13 illustrates the Service PBS (or Peak Burst Service) calendar.

Starting with FIG. 9, block 500, the flow queue is examined to determine if the queue contains any packets (Queue Count or QCnt=0). If the queue is empty, the process continues at FIG. 10, block 541, otherwise the queue is not empty and the process continues with blocks 512, 505 and 521.

Block 505 tests to determine if the calendar in service is a timer based LLS or NLS calendar. If so, processing continues with block 1101 in FIG. 11 and is described below.

Block 521 tests to determine if the calendar in service is a timer based PBS calendar. If so, processing continues with block 1306 in FIG. 13 and is described below.

Block 512 tests to determine if the calendar in service is a WFQ calendar. If so, a packet is dequeued from the flow queue (list management action) and the process continues at block 503 and tests if the SLA for this flow queue includes a Maximum burst size component (MBS.V is not equal to 0); if so, then the MBSCredit field of the flow queue is updated to reflect the usage (as described in the Reconnection Patent). The process continues at block 513 where the flow queue's frame count is tested. When the frame count is one or less (the No branch from 513), additional processing is required to determine if the flow queue should be moved to another location in the calendar, or if it should be removed; this determination is illustrated in FIG. 12 and is discussed below.

When the frame count is 2 or greater (the Yes branch from 513), the flow queue is examined for a best effort peak bandwidth service component at block 514. If there is a best effort peak bandwidth service component, then processing continues at block 516 (the No branch) where a test to determine if the flow queue is being serviced too early and would be in violation of the peak bandwidth specification for this flow queue. If the flow is found to be in violation (the Yes branch out of 516), the flow queue is removed from the WFQ calendar (QinBlue=0 at 528) and the NextGreenTime field in the flow queue is updated for a flow in violation as described in the Reconnection Patent (block 518).

Returning to block 528, processing continues to determine if the flow queue's peak bandwidth component is restricted by use of a maximum burst size specification (at 523) and if it is restrictive, is there any credit remaining to this flow queue (at 524). If there is no restriction, or if there is remaining MBSCredit, the flow queue is added to the PBS calendar at the time specified by the NextGreenTime calculation for a flow in violation as described in the Reconnection Patent (block 517). Otherwise, the flow queue is not re-attached to a calendar.

Returning to block 514, if best effort peak bandwidth is not specified for this flow queue and if there is a restriction on use of best effort bandwidth by use of a maximum burst size specification (No branch at 525), and if there is any remaining credit for the flow queue (Yes branch at 526), then the flow queue is re-attached to the WFQ calendar at the location specified by the WFQ distance calculation the Queuing Patent. Otherwise, the flow is removed from the WFQ calendar (at 529) and is not re-attached to any calendar.

Returning to block 516, if the flow is not in violation of its best effort peak bandwidth specification (Yes branch at 516), then the NextGreenTime field of the flow queue is updated using the calculation for a flow not in violation as described in the Reconnection Patent at 520. Processing at 521 and 522 determines, as described above, if the flow is restricted by maximum burst size specifications (521) and if so to test if there is any remaining MBSCredit (522). If there is no remaining credit, then the flow is removed from the WFQ calendar (527) and is not re-attached. If there is no restriction or if there is credit, then the flow queue is added to the WFQ calendar at the location specified by the WFQ distance calculation as described in the Queuing Patent (block 519).

FIG. 10 illustrates flow queue service when QCnt=0 at the start of service, that is, the handling of a flow queue that is found empty (QCnt=0 at block 500, from FIG. 9) when selected for service. Actions vary dependent on the calendar, however, in all cases the flow queue is not re-attached to any calendar. Blocks 541, 543 and 548 determine the calendar type. Blocks 542, 544 and 549 remove the flow queue from the calendar and clear the InUse bits. The frame count is set to 0. Additional modifications are required if the flow queue was selected from a WFQ calendar and the flow queue specified a best effort peak bandwidth. If the flow queue is not being serviced too soon based on its peak bandwidth specification (No branch out of block 546), then the Next- GreenTime is marked invalid at block 547. This allows subsequent service to the flow queue access to best effort service.

Several elements in FIG. 10 provide functions to support flow queue aging. These are indicated by braces "{"and"}"in this figure in blocks 542, 547 and 549 NextRedValid and NextGrnValid are flags used to support a flow queue aging design.

FIG. 11 illustrates handling of a flow queue selected for service from a timer based NLS or LLS calendar. A frame is dequeued from the selected flow queue (block 1101) and all the list management fields are updated as described in <the Scheduler Structure Patent. The process continues to determine if the flow queue is to be reattached to the calendar or removed. At block 1106, a test for a zero frame count is made; if the frame count is zero (Yes branch from block 1106), the flow queue is removed from the calendar (block 1110) and the NextRedTime and RedResidue fields are updated as described in the Scheduler Structure Patent and the Calculation Patent.

Returning to block 1106, if the FrameCount is not zero, then the flow queue is reattached to the calendar at the location specified by the distance calculation (blocks 1108 for LLS and block 1109 for NLS calendar service) as described in the Scheduler Structure Patent and the Calculation Patent.

FIG. 12 illustrates service to a flow queue which was selected from a WFQ calendar, and has a FrameCount of 1 or 0. At block 603, the condition for a frame count of 0 is tested; if true, then flow queue is removed from the WFQ calendar (block 604) and the flow queue is examined for a best effort peak bandwidth specification at block 605. If the flow queue has a best effort peak bandwidth specification (No branck from block 605), then the NextGreenTime field is updated. The type of update is determined by testing to see if the frame service occurred too early as specified by the flow NextGreenTime field (at block 606). If the frame service occurred too early (Yes branch from 608), then the NextGreenTime field is updated using the calculation for a flow in violation; otherwise, the NextGreenTime field is updated using the calculation for a flow not in violation (both calculations are discussed in the Reconnection Patent).

Returning to block 601, the FrameCount is tested for a value of 1; if true, the flow queue is examined for a minimum bandwidth specification. If the flow queue has a minimum bandwidth specification, processing continues at 604 and is described above.

If the flow queue does not have a minimum bandwidth specification, then processing continues at block 514 in FIG. 9 and is described above.

FIG. 13 illustrates service to a flow queue which was selected from a Peak Burst Service (or PBS) calendar. A flow queue is always removed from this calendar and NextGreenTime is always recalculated. A flow queue is placed into the Weighted Fair Queuing (WFQ) calendar only when there are sufficient frames in the flow queue. If MBS is specified, a test for available credit is performed. In this case the service determines if the flow queue should be re-attached to a WFQ or not. In any case, the flow queue is not re-attached to the PBS calendar since the PBS calendar's purpose is to delay service of a flow queue that has exceeded its best effort peak bandwidth specification.

Block 1306 removes the flow queue from the PBS calendar. Block 1310 tests to see if the target port queue, as specified by the flow queue, is congested. Congestion is the result of more frames being placed into the target port queue than can be serviced by the attached media. This congestion test is the same as the one used when determining which WFQs should be considered for selection as described in the Scheduler Structure Patent. This test must be done here since it is not until the flow queue is selected can it be determined what the target port queue is. If the target port queue is congested (Yes branch from 1310), then a frame is not dequeued and processing continues at block 1312, where processing determines if the flow queue may re-attached to a WFQ calendar. At 1312, the FrameCount is tested for value greater than 1; if true, then the flow queue is added to the WFQ calendar (block 1315) at the location specified by the distance calculation for flow start up as described in the Scheduler Structure Patent. If the FrameCount is equal to 1 (block 1313), and the flow queue does not have a minimum bandwidth specification (Yes branch from block 1314), then the flow queue is added to the WFQ calendar (block 1315) at the location specified by the distance calculation for flow start up as described in the Scheduler Structure Patent. If the frame count is 0, or if the frame count is 1 and the flow queue does have a minimum bandwidth specification, the flow queue is not re-attached to the WFQ calendar.

Returning to block 1310, if the target port specified by the flow queue is not congested, then a frame is dequeued from the flow queue and processing continues at 1304 where the NextGreenTime field is updated using the calculation when a flow is not in violation. Processing continues at block 1316 where the flow queue is examined for a maximum burst size specification, and if specified the MBSCredit of the flow queue is updated (block 1317).

Processing continues to determine if the flow queue can be re-attached to a WFQ calendar. Blocks 1307 and 1308 determine if there is a maximum burst size specification and if there is any MBSCredit remaining. If there is such a specification, and if there is no more credit, then the flow queue is not re-attached; otherwise processing continues at 1302 where the flow queue's FrameCount is examined. If the FrameCount is 2 or greater, then the flow queue is added to the WFQ calendar (1318) at the location specified by the WFQ distance calculation (1303). Returning to blocks 1302 and 1300, if the FrameCount is equal to 1, and there is no minimum bandwidth specification, then the flow queue is added to the WFQ calendar (1318) at the location specified by the WFQ distance calculation (1303). If the FrameCount is 0 or if the FrameCount is 1 and the flow queue has a minimum bandwidth specification, then the flow queue is not re-attached.

Of course, many modifications of the present invention will be apparent to those skilled in the relevant art in view of the foregoing description of the preferred embodiment, taken together with the accompanying drawings. For example, the types of service which are accommodated are somewhat arbitrary and can be adjusted. For example, a user might have a first service during the day when there are many users and high competition for bandwidth and a higher service or service level at night when there may be a lower demand for service. Additionally, many modifications can be made to the system implementation and the system of priorities and various algorithms can be used for determining priority of service without departing from the spirit of the present invention Accordingly, the foregoing description of the preferred embodiment should be considered as merely illustrative of the principles of the present invention and not in limitation thereof.

Having thus described the invention, what is claimed is:

1. A system for processing frames and enqueuing the frames on an output where the system serves users having different types of service, the system comprising:

a first calendar for serving users which have a first type of service;

a second calendar for serving users which have a second type of service;

a third calendar for serving users having a third type of service;

a first algorithm which places a first pointer in the first calendar when the user has a first type of service;

a second algorithm which places a second pointer in the second calendar when the user has a second type of service and is within the limits set by the user level of service;

a third algorithm which places a third pointer in the third calendar when the user has selected that type of service and when the user has selected the second type of service but has exceeded the limits set for the second type of service; and a fourth algorithm which removes frames from flow queues according to stored logic.

2. A system for processing frames and enqueuing the frames on an output including the elements of claim 1 wherein one type of service is a minimum bandwidth service and further including a timer for providing periodic service to a flow which has a minimum bandwidth to allow the minimum bandwidth to be provided.

3. A system for processing frames and enqueuing them on an output including the elements of claim 2 wherein, when a flow which has minimum bandwidth service exceeds the minimum bandwidth service, the excess of the minimum bandwidth may be handled by another service.

4. A system for processing frames and enqueuing them on an output including the elements of claim 1 wherein a service provides for a weighted fair queuing and including a mechanism which determines the priority in the calendar.

5. A system for processing frames and enqueuing them on an output including the elements of claim 4 wherein the mechanism which determines the priority in a calendar includes a calculation which is based on the length of at least one frame from the flow.

6. A system for processing frames and enqueuing them on an output including the elements of claim 1 and further including a first arrangement for providing minimum bandwidth service and a second arrangement for providing weighted fair queuing service.

7. A system for processing frames and enqueuing them on an output including the elements of claim 1 and further including a first arrangement for providing minimum bandwidth service and a second arrangement for providing weighted fair queuing service and further including a service to provide weighted fair queuing service to a user who has minimum bandwidth service when the user exceeds the limits of the minimum bandwidth service.

8. A system for processing frames and enqueuing them on an output including the elements of claim 1 and further including a first arrangement for providing minimum bandwidth service, a second arrangement for providing weighted fair queuing service and a third service which allows for best efforts service.

9. A system for processing frames and enqueuing them on an output including the elements of claim 8 wherein the weighted fair queuing service includes a mechanism for adjusting the priority of a user according to the length of frames for that user.

10. The system of claim 1 wherein the fourth system includes logic that detach selected pointer from selected ones of said calendar.

11. The program product of claim 10 wherein the service includes minimum bandwidth service and best effort bandwidth service.

12. A method of placing processed frames on an output after processing and establishing and enforcing a system of different types of service levels, the method comprising the steps of:

providing separate calendars for serving at least two separate types of services;

establishing at least a first and second type of service, with one of the types of service having a limit on the bandwidth which can be used;

identifying a type of service with each flow of processed frames, and, for a service having a limit on the bandwidth which can be used, the respective limit;

establishing a logical priority for the separate calendars serving the first and second types of service;

allowing one of the separate calendars to provide the higher priority service for a user until the user reaches the limit on the bandwidth which can be used;

serving the service for the lower priority service with another of the separate calendars when service for the higher priority service is not required; and treating requests for service from the higher priority service which exceed the limit on bandwidth which can be used to be considered as lower priority service requests.

13. A method of placing frames on the output and establishing and enforcing a system of different types of service levels including the steps of claim 12 wherein the higher priority service includes a minimum bandwidth service up to an established bandwidth limit and a lower priority service is a best efforts service.

14. A method of placing frames on the output and establishing and enforcing a system of different types of service including the steps of claim 12 and further including the step of establishing a third type of service and allocating a priority to the third type of service.

15. A method of placing frames on the output and establishing and enforcing a system of different types of service including the steps of claim 14 wherein the third type of service is a fair queuing system.

16. A method of placing frames on the output and establishing and enforcing a system of different types of service including the steps of claim 15 wherein the third type of service includes a system for weighting the priorities of different users of the service.

17. A method of placing frames on the output and establishing and enforcing a system of different types of service including the steps of claim 16 wherein the third type of service includes a weighting for the length of the frame.

18. A system for processing frames and enqueuing the frames on an output where the system accommodates flows with different types of service including combinations of different types of service, the system comprising:

a first calendar which supports a first service;

a second calendar which supports a second service;

logic which schedules frames onto the output from the first calendar and the second calendar, said logic including interaction between said first and second calendars to allow a single flow to be included simultaneously on both calendars and to determine when the flow is enqueued on the output.

19. A system for processing frames including the elements of claim 18 wherein the services are chosen from a group including minimum bandwidth, best effort, peak and maximum burst size, allowing a given flow to have both a minimum bandwidth service and best effort service, wherein the system includes the first calendar for servicing the minimum bandwidth and the second calendar for servicing the best effort and the logic places the given flow simultaneously in both calendars to determine when it must come out, given the minimum bandwidth service and the best effort service.

20. The system of claims 1 or 18 further including a plurality of flow queues operable to buffer list of frames wherein each flow queue has a predefined bandwidth specification associated with it.

21. The system of claim 20 wherein the bandwidth specification is part of a service level agreement between a service provider and user of a provided service.

22. The system of claim 1 or 18 wherein at least one of the first calendar and the second calendar includes n epochs wherein n>1.

23. A method of processing frames and placing the processed frames from a plurality of flows onto an output based upon different types of service levels associated with the flows, the steps of the method comprising:
   establishing a first calendar to support a first type of service;
   establishing a second calendar to support a second type of service;
   determining the types of service which have been selected for a given flow and using the types of service to select the calendars which service the flow;
   using the calendars to determine the order in which processed frames from the flows are placed onto the output; and
   allowing a single flow to be placed simultaneously on the first and second calendar and serviced from both the first and second calendar by using logic to determine when a flow is serviced.

24. A method of processing frames including the steps of claim 23 wherein the types of service include minimum bandwidth and best effort with a calendar to support each type of service and the step of determining the types of service include determining that a given flow has both minimum bandwidth and best effort and places the flow simultaneously in both the calendar for minimum bandwidth and the calendar for best effort.

25. A method of processing frames including the steps of claim 23 wherein the types of service include minimum bandwidth, best effort, peak and maximum burst size and the services include combinations of these types of service.

26. A program product for use in a computer or like machine comprising:
   a medium on which a computer program is recorded, said computer program including
   a first module with instructions for placing at least a first pointer on a first calendar when a user has a first type of service;
   a second module with instructions for placing at least a second pointer on a second calendar when the user has a second type of service and is in limits set by the user level of service;
   a third module with instructions for placing at least a third pointer on a third calendar when the user has selected that type of service and the second type of service but has exceeded the limits set for the second type of service, and
   a fourth module with instructions to remove a frame from a flow queue identified by a pointer selected by stored logic.

27. A system for processing frames and enqueuing the frames on an output where the system serves users having different types of service, the system comprising:
   a first calendar for serving users which have a first type of service;
   a second calendar for serving users which have a second type of service;
   a third calendar for serving users having a third type of service;
   a first algorithm which places a first pointer in the first calendar when the user has a first type of service;
   a second algorithm which places a second pointer in the second calendar when the user has a second type of service and is within the limits set by the user level of service;
   a third algorithm which places a third pointer in the third calendar when the user has selected that type of service and when the user has selected the second type of service but has exceeded the limits set for the second type of service; and
   a fourth algorithm which removes frames from flow queues according to stored logic wherein at least one of the first calendar and the second calendar includes n epochs wherein n>1.

* * * * *